Figure 1:

March 26, 1963 D. W. RAHMES 3,083,124
CELLULAR MATERIALS AND ARTICLES AND METHOD OF PRODUCING
Filed March 20, 1959

INVENTOR
Donald H. Rahmes

BY Lewis H. Lanman
ATTORNEY

United States Patent Office 3,083,124
Patented Mar. 26, 1963

3,083,124
CELLULAR MATERIALS AND ARTICLES AND METHOD OF PRODUCING
Donald W. Rahmes, Dover, Del., assignor to International Latex Corporation, Dover, Del., a corporation of Delaware
Filed Mar. 20, 1959, Ser. No. 800,763
4 Claims. (Cl. 117—163)

This invention relates generally to porous or cellular articles, foam compositions for use in making such articles, and to methods for their production. More particularly, the invention relates to new foamed latex compositions, and resilient porous articles produced therefrom, including specifically composite articles of latex foam or sponge rubber coated on a substrate.

Heretofore foamed latex for foam rubber has been produced by mechanical agitation or whipping of concentrated latex including foam stabilizers such as soaps. The mechanical frothing of the latex is accomplished by special machines equipped with wire whips, agitator pins, or squirrel cage design to beat air into the latex by agitation and disruption of the liquid continuum. The foamed latex is gelled by delayed gelling agents, e.g. sodium silicofluoride, usually added during frothing. The gelling process must be perfectly balanced, that is, gelling or setting of the foam must occur before the soap is precipitated by the drop in pH caused by the gelling agent. Otherwise, the foam is unstable and collapses. Thus, the frothed latex dispersion is not a permanent foam, that is, stable against collapse, until gelation and then only under particular gelling conditions requiring close control. Furthermore, during drying and curing, these foams have an undesirable tendency to shrink.

In other rubber foam or sponge production methods, a gas generating or gas evolving agent is incorporated into latex, and the agent is decomposed by heat or otherwise, thus blowing the latex into a foamed structure. In one such process, the blown foam is frozen and the rubber phase coagulated with carbon dioxide gas while the foam is rigid. Such blowing methods also require controlled gelation and necessitate molds or platens, or other closed pressure apparatus to confine the evolved gas to blow the latex into cellular form.

The foamed latex in these methods must be gelled within a relatively short time after preparation, and the sensitivity of such foams, the close control of conditions required, and the foaming equipment costs, as well as the cost of rubber in the foam, militate against many potential end uses.

The cured latex foam or sponge produced from the foamed latex by drying and curing, whether of the closed or intercommunicating cell type, is characterized by a structure which consists essentially of air cells having walls defined by a very thin membrane of cured or vulcanized latex rubber. Fillers and loading agents, for example, whiting, bentonite, and other clays, have been incorporated as slurries in limited amounts in the foam. They are essentially extenders, which increase the compression resistance and density of the foam rubber, while lowering the cost. However, the properties of the wet foamed latex and structure of the foam product remain essentially unchanged. The disadvantages regarding foam instability are aggravated by addition of loading agents, and the requirements of fresh preparation before use, close gelation control, and equipment costs are not circumvented. Thus, there is a definite need for a more stable, less sensitive foam composition and a simpler, more economical method of production which eliminates foaming equipment costs and reduces foam material costs, and from which porous or cellular articles may be produced, such as foam or sponge rubber suitable for various end uses of ordinary foam, and also enabling extended utilization of foam.

The present invention provides such a method and foam compositions, in particular foamed latex compositions, having a different and more stable structure than ordinary foamed latex. It further provides cellular articles, particularly elastic and resilient latex foam articles in which the dried and cured foam is of different structure and exhibits improved properties for many uses compared to ordinary latex foam.

It has been discovered that remarkably stable foam compositions may be produced by the introduction and mixing of finely divided or particulate solids, such as ground rubber particles, into an aqueous dispersion of a rubbery binder, for example, latex. The mere introduction and mixing of the particulate solids into the dispersion through a gas-liquid interface causes entrainment of air and formation of a froth of minute air bubbles within the continuous aqueous phase of the dispersion. The introduced particles function as the essential air-entraining or foaming means, the foam being formed without any expensive foaming machines, such as the well-known Hobart squirrel cage type, or the Oakes continuous foamer. The result is a stable foamed binder dispersion, e.g. foamed latex, in which the air-entraining particles are suspended.

The air-entraining solids are preferably gradually or continuously added to a body of binder dispersion to form the stable foam, while subjecting the latex to ordinary stirring. Alternatively, the air-entraining solids may be added in increments or successive portions at different times to obtain the desired solids content and foam density.

The foam compositions produced by the present invention do not depend for stability upon a gelation process as in the case of whipped or blown latex foam using a chemical gelling agent. The mixture of air-entraining particles, binder dispersion and air bubbles stiffens and thickens upon continued addition and mixing in of the particles until a stable, self-supporting, permanent foam is produced. The quantity or content of air-entraining particles suspended in the foamed binder dispersion is simply that which is sufficient to provide structural stability of the foam without gelation or setting of the binder. One skilled in the art may readily determine the quantity of air-entraining particles required for the particular stiffness desired in the resulting foam, which depends somewhat on the type of particle and viscosity of the binder dispersion. The introduced particles therefore are not only the primary foam-producing means, but also provide "green" strength in the wet foam condition prior to drying and curing, which prevents collapse of the frothed mixture. The foam formed is generally of substantially coatable consistency. It may easily be coated or spread in layers of desired thickness upon any coatable substrate, or supporting surface for permanent adhesion or temporary support. It may also be formed into desired shapes by various techniques, such as molding or extrusion, and by control in viscosity or density of the foamed mixture by limiting the quantity of introduced particles, or thinning, it may be made flowable for casting or mold charging. It exhibits thixotropic properties in that it tends to become more solidified and non-flowing upon standing prior to drying and/or curing. Reworking imparts a coatable or flowable viscosity. This important property thus permits storage after preparation, and indicates that it may be prepared at one site, and then transported to another for application in final product fabrication. Also the simplicity of its preparation, and lower cost provides a foam which may be fully utilized by those unable to justify ordinary foam production on a cost basis.

The new foam compositions may therefore generally be described as a foamed aqueous dispersion of a suitable, preferably rubbery, binder material, comprising a self-supporting coatable mixture of air bubbles and air-entraining particles, said particles being added to and suspended in the binder dispersion in effective amounts to froth the dispersion and to impart to the resulting foam a stable, non-collapsible structure.

In order to produce cellular articles or finished foam from the wet foam, a deposited layer, shape or body of wet foam is subjected to drying, preferably accelerated by heating. It is an advantage of the invention that during this step an increase in volume of the foam may be obtained, as contrasted to the shrinkage during drying of conventional foam. This volume increase, usually measured in terms of increase in height or thickness of the foam layer provides a favorable reduction in density of the dried foam. Water is driven off from the wet foam during the heating, and the binder dispersion coating the particles and enveloping the air cells dries and sets or coagulates to adhere the mass into a unified cellular article.

It is believed, without limiting the invention to any theory, or mechanism of action, that volume increase during drying is due to the expansion of air and generation of water vapor within the minute bubbles of the wet foam. This results in enlargement of the air bubbles, coalescence and bursting, while the mass is prevented from shrinking and collapsing during drying and before setting of the binder by the introduced air-entraining particles dispersed in the foam forming a supporting network or structure. It has been observed that this volume increase is accompanied by a well defined, continuous skin or layer of binder formed on the surface of the foam. The extent of expansion during the heating and drying step appears to depend upon the porosity or gas permeability of the skin. When a continuous skin forms on the foam, gas permeability is reduced and volume increases of from 10% to 20% and even higher are obtainable. On the other hand, where the skin of dried binder is porous or discontinuous, and gas permeates it more readily, the volume increase during drying may be relatively negligible. The formation of a continuous, thicker and less permeable binder skin is favored by foam solids contents below about 70%, preferably obtained by addition of small quantities of water to a preformed wet foam, while avoiding reduction of solids content to such an extent that loss of thixotropic property and separation of the suspended particles occurs. This lower solids content varies both with the type of air-entraining particle and the composition of the binder and may be determined by one skilled in the art by simple experiment for any given solids-binder dispersion combination. In some instances it may be reached above 50%, while in others much lower solids may be tolerated. In any event, the final thickness of the dried foam increases with decreasing total solids content in the wet foam, and accordingly lower densities may be obtained in this manner.

In addition, the presence of protective or lyophilic colloids in the binder dispersion, such as those often employed in latex compounding for stabilizing and/or thickening, also favors lower dry foam densities and provides improved coatability of the wet foam. Among such materials may be mentioned the proteinaceous type, e.g., casein, the carbohydrate polymers, such as mucilages of plant origin, which are well known and are derived from seeds and roots (intracellular) e.g., guar bean, locust bean, and linseed; the natural gums derived from trees and shrubs as exudates (extra-cellular), for example, gum tragacanth, gum arabic, karaya gum, gum ghatti and the like, or from seaweeds, e.g., carrageenin, agar, and alginates, and even grains (pentosan type); and the synthetic gums, e.g., carboxyethers of cellulose and alkali metal polyacrylates. Accordingly, such materials are preferred in the practice of the invention with the various types contributing advantages particularly adapted for certain purposes.

In general, the foam products of the invention may be described as foam-derived cellular structures, particularly elastic and resilient cellular structures, such as latex foam, comprising solid particles and predominantly open or intercommunicating air cells in which the walls of the individual cells are defined by a plurality of said particles arranged in bridging and contacting relation, said particles being adhered in said structure by a coating of rubbery binder.

The invention finds its major application in the production of flexible, resilient sponge or foam products. Accordingly, although not to be regarded as limited to an elastic resilient foam made by introduction of rubbery air-entraining particles into a latex, such a product is selected for the further specific and detailed description of the invention.

Referring to the drawings, which are schematic, and intended to illustrate the invention without limitation to the specific embodiment shown.

Figure 2:
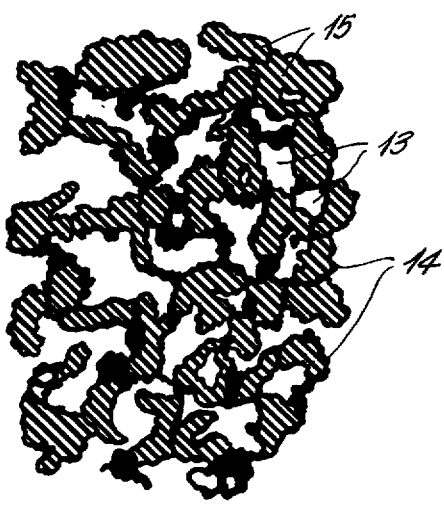
Figure 3:
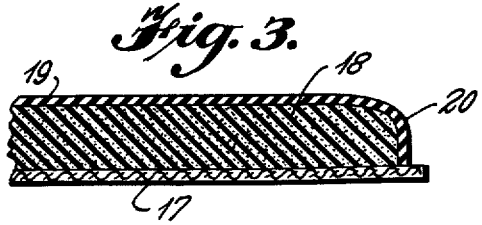

FIGURE 1 illustrates a magnified view of the wet foam composition and structure, FIGURE 2 illustrates a magnified view of the structure of the dried foam as seen in vertical cross-section, and FIGURE 3 shows a layer of the foam composition coated on a fabric substrate, and illustrates the skin or surface layer of binder formed on the foam by drying.

FIGURE 1 is a schematic prepared from a photograph of the free surface of a wet foam at magnification of 28×. The latex was foamed using about 3 parts rubbery particles to 1 part of latex solids. The resulting foamed latex is a self-supporting mixture of rubbery solid particles 10, such as ground vulcanized rubber, suspended in a continuum of frothed latex dispersion 12 containing air bubbles 11 formed by the air-entraining action of the rubbery particles upon introduction and mixing into the latex. The air bubbles predominate in number over the particles and vary widely in size from extremely minute to as large or somewhat larger than the particles. The walls of the air bubbles are defined by a film of latex, the latex also coating the air-entraining rubbery particles as soon as they are wetted. The average size of the random sized air bubbles is below that of the air-entraining rubbery particles. The wet foam, as shown, is a stable, stiff or essentially non-flowing, non-collapsing permanent foam prior to drying and without gelling of the binder.

FIGURE 2 is a schematic of a cross-section of dried foam prepared from a 28× magnified photograph. The air cells 13 are enlarged and predominantly open or intercommunicating compared to the closed, spherical air bubbles 11 in the wet foam. The particulate rubbery solids are arranged in bridging and contacting relation so that a plurality of particles define the walls of the individual air cells with the cells conforming to the shape of the irregular particles. The dried latex binder coats the rubbery particles and cements them into a unified cellular article, and the binder itself occasionally forms bridges within the structure. In the dry foam, the air cell size is generally larger than the size of the particle, a reversal of the comparative sizes of air bubbles and particles in the wet foam.

The skin formed during drying by heating is illustrated in FIGURE 3. The wet foam 18 is shown coated upon a fabric backing 17. The coating of foam layer 18 upon the fabric backing may readily be accomplished in any suitable manner known to the art. For example, the fabric may be carried on a moving support, and the foam fed to the fabric and passed under a doctor blade or bar (not shown) to provide a foam layer of the desired thickness which penetrates the interstices of the fabric and is adhesively secured thereto in the subsequent drying and curing of the binder. It is to be noted that the foam exhibits such rheological properties that it does not flow out at the sides when a layer is deposited, but curves arcuately from the horizontal surface into substantially vertical sides, the arcuate edge being of relatively short radius. The skin 19 of latex rubber binder is formed upon the wet foam as moisture is driven out of the foam during heating. The surface layer of the foam dries more rapidly than the interior and a substantially continuous layer of dried binder is formed on all exposed portions of the wet foam surface. It is to be noted that the skin forms on the sloping sides 20 of the foam layer as well as on the top. Skin formation in this manner aids in the reduction in density by expansion of the foam during drying.

The amount of rubbery air-entraining particles mixed with the latex may be widely varied to obtain foam products having an appreciable range of density and compression resistance. Any quantity of rubbery particles which provides a recognizable foam structure is regarded as within the scope of the invention. The content of air-entraining rubbery particles may conveniently be expressed as a weight ratio of particles to dry binder solids. In general, considering a desired balance of properties, including stability of the wet foam, and density, compression resistance, tensile strength and cohesiveness of the foam product, rubbery particle to latex solids ratios of from about 1 to 1 up to about 4 to 1, that is, from 100 to 400 parts of air-entraining particles per 100 parts of dry binder solids are recommended. With rubbery particles and foamed latex, lowest densities appear to occur most frequently at ratios of 2.5 to 3.5.

Illustrative of the foam densities regarded as particularly desirable for the wet foam and finished foam compositions of the present invention, the following is typical: A foam produced by mixing 280 parts of ground rubber dust into a compounded latex containing 20 parts of whiting, and 100 parts dry rubber solids had a bulk density of 0.599 g./cc. at 65% solids. Thus, the ratio of air-entraining particles to dry latex solids was 2.8 to 1. After oven drying, the dried and cured foam had a bulk density of about 0.32 g./cc. Foam of this density and composition provides excellent compression deflection properties for utilization as an integral backing or separate underlay for rugs and carpets.

The density generally tends to increase at both higher and lower air-entraining particle content both within and outside the above-indicated range of particle to latex solids. Thus, less stable and denser foams may be prepared at air-entraining particle to binder solids ratios of less than about 1 to 1, and on the other hand, stable denser foams may be prepared at particle to binder solids ratios greater than 4 to 1, but these generally exhibit lower tensile strength as the binder content decreases.

Densities as low as between 0.25 and 0.30 have been reached, while higher densities up to 0.5 and above may be obtained, if desired, with increased particle charge or loading. As may be seen increased density resulting from higher scrap particle charge and higher loading decreases the cost per pound, but it increases the cost per square yard of coated surface due to lower coverage at a given foam layer thickness. As a rule, the unit coating cost is controlling, and therefore lower densities are desired.

It is to be understood that the invention embraces foamed latex compositions in which only a portion of the air-entraining rubbery particles has been incorporated. Such a "partially" foamed material may be prepared at one site, transported to another site for subsequent addition of the balance of air-entraining particles of the same or different type, i.e., rubbery or non-rubbery, to produce foam products having the desired densities obtainable by the method of the present invention. In such cases, the partially foamed material may have well under a 1 to 1 ratio of particles to latex solids, for example, only 50 parts per 100 of latex, and exhibits less stiffness and a tendency to flow under gravitational force.

From the foregoing it will be seen that a fundamental economic advantage is provided by the invention in that within the preferred range of rubbery particle content, the dry latex solids constitute less than half the weight of the finished foam. Conversely, over one-half of the weight of finished foam may be low cost waste or scrap rubbery material.

The air-entraining rubbery solids may be produced by subdividing natural or synthetic rubber, preferably scrap, into particle form, which may be referred to as crumb, or crumb-like. Rubber scrap of any available type is suitable, such as tire tread, white sidewall, inner tube, hose, and shoe sole stocks, and also rubber-fiber mixtures such as, sidewall or other corded stocks. Scrap foam latex, sponge rubber or other low bulk density or porous particles may be used with advantage to produce lower density products. The material may be broken down and subdivided by passing the scrape through closely set rollers in a rubber mill, or in a breaker mill to reduce the stock to a particle size range and distribution suitable for use as the air-entraining particles in producing the novel foam of the invention. The ground material may be subjected to screening or other sizing to remove undesirable undersize or oversize particles.

The rubbery particles by the nature of their preparation are of random shape with irregular surfaces. This enhances the air-entraining function and also reduces their packing tendency, both of which characteristics favor a lighter foam.

The particle size selected for the foam-producing ground rubber dust or crumb is dependent primarily upon the desired air cell size in the final product. As the particle size increases, the arrangement of the particles in bridging relationship allows larger cells to form upon drying of the wet foam. As the particle size is reduced, the particles are more closely packed and form greater numbers of shorter bridging structures leading to the delevopment of small or fine air cells.

Suitable foams for most applications are produced when the rubber scrap particles are predominantly between about 8 and 100 mesh, standard U.S. screen size, that is, below about 0.1 inch down to about 0.005 inch. However, foams have actually been prepared in accordance with the invention using particle sizes up to one-quarter inch in which the size range was predominantly minus 3 to plus 12 mesh. Extremely fine-celled foams may be prepared from rubber particles which are predominantly minus 100 mesh in size. Within the range of 8 to 100 mesh, the predominant size for the most desirable results lies between about 30 to 70 mesh.

For the production of flexible and resilient cellular articles, the binder dispersion is a rubbery material suitably selected from among any of the curable or vulcanizable rubbery compositions, that is, elastomeric polymers or copolymers, which are water dispersible or which may be prepared directly in latex form. Thus, the latex for the foam may suitably be natural rubber or any synthetic rubber, or blend of the same. Among the synthetic elastic latices there may be mentioned: polybutadiene 1,3, copolymers of butadiene 1,3 and styrene (GR–S), the oil resistant copolymers of butadiene 1,3 and acrylonitrile (GR–A or Buna–N), poly-(2-chloro-butadiene-1, 3) or neoprene, and other well-known rubbery copolymers of conjugated dienes and copolymerizable olefinically unsaturated polymers, which are too numerous to list. Water dispersions of polyisobutylene (butyl rubber), isoprene, rubbery organic polysulfide polymers (Thiokol rubber), polyacrylates, polyvinyl polymers are also suitable.

It is a further distinct advantage of the invention that synthetic rubber latices of the acid copolymer type prepared from conjugated dienes and carboxyl containing copolymerizable vinyl monomers may be utilized. Such latices may be either acidic or alkaline. In conventional foam production, alkaline latices are required for the critical gelling process in which the chemical gelling agent reduces the pH to cause gelling. The synthetic acid copolymer latices, such as carboxylic butadienenitrile latices, for example, a butadiene-acrylonitrile-methacrylic acid latex, are also advantageous in that they exhibit excellent pure gum tensile strengths and need no vulcanization to provide foams of adequate strength for many purposes.

The selected latex is compounded in the usual manner by the addition of conventional compounding materials in amounts well-known to the art, including antioxidants, fillers, inhibitors, stabilizers, accelerators, vulcanizing and curing agents. Pigments may advantageously be incorporated for coloring the entire foam uniformly, or colored rubber scrap may be utilized, in either single or multicolor to provide speckled patterns.

Advantageously, latices suitable for the foam production are those having conventional latex solids content, such as from 40 to 60%. However, these rubber dispersions may be concentrated, creamed, diluted, thickened, thinned, or otherwise adjusted with reference to viscosity and solids content as may be desired for foam properties.

In the production of the foamed latex, any type of stirring or mixing is suitable, which results in drawing down into the liquid dispersion the particles charged to the gas-liquid interface. No whipping or beating action is required, since the particles carry the air into the binder dispersion and thus create a foam. As the finely divided solids are added, either continuously or incrementally, the foamed dispersion thickens, and stirring is continued at a rate sufficient to maintain proper mixing in of the particles and to impart a uniform consistency to the foam mixture.

After foaming, the foam is coated upon a substrate, or otherwise shaped, and subjected to drying by heat, for example, in a circulating hot air oven, at temperatures sufficient to both remove the water from the mixture and to cure or set the latex binder. Temperatures of from 200 to 400° F., preferably 250 to 350° F., are suitable, and the time will vary somewhat inversely. Typically a foam of the invention having 65% or more solids content spread in a $\frac{3}{16}$ inch layer dries in 20 minutes at 250° F. Of course, the drying and curing time will vary with the thickness of the wet foam. This drying time compares very favorably with non-foamed latex coatings on carpets.

The drying may also be accomplished by any other suitable heating means such as high frequency current, infra-red radiation, or by any other practical heating and drying method.

The foam coatings or layers may be widely varying in thickness, provided they are not so thin that the resulting article loses its cellular characteristics by destruction of the air cells in the wet foam. Thicknesses are preferably within the range of from about ⅛ up to about 1 inch. Thick layers involve the difficulty of extended drying times in a hot air oven. However, the thicker gage foam products may be dried more readily by utilizing infra-red heating, or induction heating when the substrate upon which the layer is coated is conductive, or by resistance heating when the foam layer with or without the substrate is non-conducting.

The latex foam of the invention is particularly suitable for resilient or cushioning underlays or mats for carpets and rugs, or as a backing applied directly to a carpet, rug, or other pile fabric. Among the many other uses may be mentioned seat covers, mattress covers, insole linings, card table covers, powder puffs, hat bands, cushioning padding of any type, ink pads, rubber stamps, and upholstery fabric backings. Other applications include resilient foam coatings on other flexible woven and nonwoven fabrics of natural, synthetic, or blended fibrous materials, coatings on rigid and flexible substrates for thermal and sound insulating structures and materials, including sandwich constructions having a foam core between plies or layers of paper, felted, or other fibrous sheeting, metal, plastic, soft-board, hardboard, composition board or any other sheet or strip material upon which the form may be deposited and to which it is adherent or may be adhered. Where the binder solids are rubbery latices, as a rule no adhesive material is required for adhering the foam layer to the substrate. However, where for any reason the foam is not adequately adhered to the substrate by the action of the binder solids after drying, any of the well-known adhesives for laminating rubber or plastics to various substrates may be employed. The substrate may be an open-mesh or foraminous material, the foam tending to fill the interstices for permanent attachment. Even unwoven cords or string in parallel or crossed arrangement are adhered to the foam as suitable backings.

It should be emphasized that the air-entraining or foam-forming particles need not be rubbery where a resilient foam product is not required. The invention is thus applicable to rigid and semi-rigid foams. In such instances, the invention contemplates a wide variety of air-entraining particles having quite divergent properties. Among the inelastic materials suitable there may be mentioned natural and synthetic cellulosic particles, for example, ethyl cellulose, sawdust and other ground cellulosic waste materials. In addition, plastics or resins of the thermosetting or thermoplastic type may be utilized, such as polystyrene, phenol-aldehyde, urea-aldehyde, melamine-aldehyde resins, polyacrylates and other vinyl and vinylidene polymers. Other particulate materials are suitable, preferably waste materials, both organic and inorganic, which will not coagulate the latex on addition and which may be suspended in the resulting foam.

An alternative procedure of the invention provides lower bulk densities in the finished foam on the order of 0.25 g./cc. This is accomplished by adding a chemical blowing agent, that is, a gas evolving substance to the preformed wet foam. Various agents, such as soluble carbonates and bicarbonates, e.g. ammonium and alkali metal are useful. Also nitrogen blowing agents, that is, agents which give off nitrogen by chemical reaction or thermal decomposition, may be used in this modification of the process. It has been noted that such blowing agents added to the wet foam produce foam volume increases of 25 to 30% and, of course, corresponding density reductions are obtained in the dried foam.

Various amounts of gas blowing agent, for example, up to about 20 parts per 100 parts of dry latex binder solids may be used to provide volume increases in the preformed foam of from about 10 up to 30%. Among the various nitrogen blowing agents suitable are azo compounds and other organic nitrogen compounds among which may be mentioned alpha, alpha', azo bis-isobutyro-nitrile (Porofor N), diazoamino benzene (Unicel), N,N' dinitroso pentamethylene tetramine (Unicel ND), p-p-oxy-bis phenylene sulfonyl hydrazide (Celogen), and p-terbutyl benzoyl azide.

The invention is illustrated in the following examples, which are not intended to constitute a limitation thereof, but rather complete and specific embodiments thereof. All quantities previously and hereafter referred to, are expressed in parts or percent by weight, except where otherwise indicated.

*Example 1*

A black rubber scrap consisting of ground tire treads and designated 9306 by U.S. Rubber Reclaiming Co., Inc. had the following size consist:

| U.S. Standard Screen | Range of Sizes, Percent | Average Size, Percent |
|---|---|---|
| 20 | 0 | 0 |
| 28 | 18–27 | 22 |
| 50 | 59–69 | 62 |
| 100 | 10–18 | 15 |
| −100 | 3 max. | 1 |

The ground rubber scrap analyzed 58% rubber hydrocarbon, 23.4% carbon black, 9.3% acetone extractable solids, and 6.3% ash by standard procedure in "Manual of Reclaimed Rubber," Rubber Reclaimers Association, Inc. N.Y.C., 1956.

A compounded latex was prepared having the following composition.

| Ingredients: | Parts |
|---|---|
| Butadiene-styrene latex (50% solids)—dry rubber solids | 100 |
| Curing system— | |
| Ethyl Zimate (zinc diethyl dithiocarbamate) | 1 |
| Zenite Special (zinc salt of 2-mercapto benzothiazole) | 2 |
| Zinc oxide | 5 |
| Sulfur | 2 |
| (Curing system total) | 10 |
| Stabilizer system— | |
| Casein | 2.5 |
| Dresinate #731 (sodium salt of a disproportionated resin acid)—emulsifier | 2.0 |
| Naprex #908 (process oil)—plasticizer | 3.0 |
| Antioxidant - Age Rite Superlite—polyalkyl polyphenol | 1.0 |
| (Stabilizer system total) | 100 |
| #9 Whiting (calcium carbonate)—filler | 20 |

After addition of KOH to a pH 9.5–10.0 to the compounded latex, 280 parts of the rubber dust were gradually added to the latex surface and continuously stirred in to provide a uniform mixture. The mixture increased in volume as the ground rubber particles were added and foam was formed. After completing the rubber particle addition, water was added to bring the total solids content of the finished wet foam to 65%.

The resulting foam was self-supporting but had a coatable consistency. It was easily worked and spread with a spatula or knife. Under magnification the foam was seen to consist of minute air bubbles in the latex and rubber dust particles suspended in the latex separate from the air bubbles. A quantity was coated upon a piece of a pile fabric carpet backing in a layer and gaged to about ¼ inch, and the coated sample placed in a hot air drying oven at a temperature of 250–270° F. for 30 minutes. A volume increase occurred during drying as evidenced by about a 15% increase in thickness of the dried foam layer to about 5/16 inch.

The resulting dried and cured foam layer was permanently secured to the jute backing of the carpet by impregnation and setting of the latex binder. The foam layer had a density of 0.32, and a resiliency as measured by static compression set tests. The sample was compressed to 50% of its thickness for 22 hours at 158° F. The percentage recovery with time was as follows.

| Percent recovery: | Time in hours |
|---|---|
| 40 | 0 |
| 60 | ½ |
| 80 | 2 |
| 100 | 5 |

The developed properties make the foam eminently suitable as underlay or resilient cushioning for any type of floor covering.

*Example II*

In this example, no vulcanizing of the latex binder was carried out, since the synthetic rubber used has sufficient tensile strength in the pure gum condition. The procedure of Example I was followed using ground scrap neoprene (polychlorbutadiene) rubber of predominantly 24 mesh U.S. standard screen size. An acid carboxylic butadiene-acrylonitrile latex (a copolymer of butadiene 1,3, acrylonitrile and methacrylic acid) of 40% solids was adjusted to a pH of between 8 and 9 with ammonia addition, the latex being stabilized with the same system as in Example I, but having no curing agents except 5 parts of zinc oxide. 300 parts of scrap particles were gradually added to the surface of the latex (100 parts dry rubber solids basis) and continuously mixed in to form a stiff self-supporting foam.

The foam was spread onto a smooth glass supporting surface and gaged to ¼ inch thickness. After drying for 20 minutes at about 270° F., a dried elastic foam of good tensile strength and a density of 0.41 g./cc. was formed. The skin formed in contact with the glass was smooth, somewhat polished, and continuous except where it tore due to adherence to the glass on removal. On the exposed surface of the foam, the skin was essentially continuous and non-porous.

*Example III*

In this example inelastic foam-producing solid particles were used with the same latex as used in Example I including the curing and stabilizing systems. 225 parts of granulated ethyl cellulose were added to the latex (100 parts of dry rubber solids) in accordance with the procedure of Example I and the resulting foam coated in a 3/16 inch layer on a woven cloth (cotton duck) backing and oven dried at 250° F. for 20 minutes.

The dried foam exhibited a distinct latex binder skin on the surface which ruptured on flexing. The cellular structure was compressible under hand pressure and exhibited resiliency by its recovery, although the foam was lacking in tensile strength without the backing.

*Example IV*

In this run, the alternative procedure was used in which a blowing agent was added to the preformed foam before drying. 250 parts of ground vulcanized scrap rubber (Xylos Rubber Co. #3800) from tire tread stock were added gradually to the surface of a GR–S type rubber latex of 50% solids content and having 100 parts dry rubber solids. The latex was compounded as in Example I. The particles were gradually mixed in to form a stiff foam. A water slurry of 5 parts of Unicel ND, N,N' dinitroso pentamethylene tetramine was added and mixed into the wet foam, and the foam was then spatula-coated onto a woven jute rug pad, gaged about 3/20 inch and dried in a hot air drying oven for 25 minutes at 250° F. During drying, the gas blowing agent released gas which increased the gage thickness of the foam layer by about 25% to 3/16 inch and gave a dried foam with a density of 0.28 g./cc. with a weight of only 39 ounces per square yard.

*Example V*

The procedure and compositions of Example I were followed except 2 parts karaya gum were substituted for the casein in the latex compound, and 5 parts of Unicel ND (Example IV) in water slurry were added to the wet foam. The gage thickness of the wet foam was .1875 inch and the foam after drying had a thickness of .202 inch and a density of only 0.280. Similar results were obtained substituting sodium polyacrylate for the karaya gum.

From the foregoing specification and examples, it may be seen that the invention provides foam compositions and finished cellular articles which are more economical by reason of reduction in latex content, and partial substitution of a waste material, such as ground rubber particles. This provides a permissible increase in density, while retaining good resilience, and compression resistance, and compression set properties. Thus, the physical characteristics of the latex foam of the invention are of particular value in manufacture of such articles as foam backed carpet, foam underlay for carpeting and rugs, and heat and sound insulating foam layers in automobile bodies and building products where the extremely light type of foam (density 0.12–0.15) is not required, and in some instances not desirable. The invention, however, can even approach these low densities by using foam rubber scrap as the air-entraining particles.

Various modifications may be made and equivalents substituted without departing from the spirit of the invention, as exemplified by the wide divergence of properties of the air-entraining particles set forth in the examples above. In addition, foams and resulting cellular articles having wide differences in properties may be produced by the invention depending upon the particular use intended. In case rigid cellular articles are desired, the binder need not be of the elastomeric or rubbery type, but may be selected from among various water dispersible plastics or resins, either of the thermosetting or thermoplastic type, such as melamine, urea and phenol-aldehyde resins, polyacrylates, polyvinylacetate and alcohol polymers and copolymers, and other water dispersible vinyl polymers. Such plastic or resinous binder dispersion may be subjected to drying after foam formation to form the necessary adhering binding coating for unifying the open-cell bridged and contacting particle structure of the foam into a unified rigid foam. In other instances where resilient foams are desired, the rubbery binder dispersion may be modified by minor additions of water-dispersible resins without rigidifying the resulting foam.

By the term "rubbery" as used with reference to the air-entraining particles and the binder dispersion solids, is meant any of the natural or synthetic elastomers which are or may be cured, or vulcanized by cross-linking either by chemical curing agents or thermally.

The term "fibrous substrate" is intended to include any woven or non-woven fabric or other fibrous materials of both natural and synthetic types. The substrate in and of itself does not form a part of the invention, and may be any foraminous, open-work, or solid material or structure to which the foam binder adheres, or may be adhered by suitable adhesive. In addition, the foam may be either temporarily or permanently coated or cast on any type of surface, including metal, wood, glass, plastic, or other solid surface, or between laminae of one or more types of such materials.

The term "particles" is used herein to designate only the air-entraining particulate solids, which are added in essentially dry discrete particle form, that is, without a liquid carrier through the gas-liquid interface of the binder dispersion. The term is not used with reference to the binder solids, which may be in the form of microscopic particles in the binder coating after drying and curing.

The term "foamed latex" refers to the intermediate or wet foam product which is produced by the introduction and mixing of air-entraining particles into the rubbery binder dispersion, and before the foam mixture is subjected to drying to produce the skin formation and to set the binder.

The terms "latex foam" refers to the finished foam or sponge which results from drying the foamed latex to produce the skin and to set the binder in the cellular structure.

In producing foam according to the invention, the transition from a liquid, flowable mixture of aqueous binder dispersion, air-entraining particles, and air bubbles to an essentially non-liquid but coatable mixture occurs relatively abruptly as the particles are added gradually to the mix. This change may be utilized as an indication of proper air-entraining particle content in the wet foam, and the mixture at this point is referred to as "thixotropic." Accordingly, the scope of the invention is not limited by the foregoing specific embodiments but rather measured by the claims appended hereto.

I claim:

1. A method of producing cellular articles which comprises introducing and mixing irregularly shaped air-entraining solid particles of from about 8 to 100 mesh in size into a aqueous dispersion of a rubbery binder through the air-liquid interface of said dispersion to entrain air into said dispersion, said dispersion having a binder solids content below about 70% by weight, said air-entraining solid particles being added in a weight ratio to binder solids of from about 1 to 1 to about 4 to 1, the introduction and mixing of said particles into the dispersion forming minute air bubbles therein to provide a uniformly aerated stable foam having a viscosity such that when dried it will form a skin of binder upon the exposed surfaces of said foam, applying a layer of the wet foam to a substrate, and subjecting said foam to drying by heating at temperatures of from about 250 to 350° F. thereby expanding and bursting the air bubbles in said foam while retaining the cellular structure by disposition of the air-entraining solid particles in bridging and contacting relation, and forming a skin of binder on the exposed surfaces of said layer with an attendant increase in volume in the cellular layer to produce a cellular structure in which the introduced solid particles are bonded together by said binder in said bridging and contacting relation defining intercommunicating cells therebetween.

2. A method according to claim 1 of producing a flexible, resilient cellular article in which the air-entraining solids introduced into said dispersion are comprised of ground rubber and the binder dispersion is a rubber latex.

3. A cellular article may be the process according to claim 1.

4. A flexible cellular article made by the process according to claim 1 in which the substrate is a flexible fibrous material and the cellular layer comprises a backing in which the bridged and contacting solid particles are rubbery and the binder is a rubbery material deposited from a latex.

References Cited in the file of this patent

UNITED STATES PATENTS

| | | |
|---|---|---|
| 1,986,404 | Madge et al. | Jan. 1, 1935 |
| 2,155,016 | Kershaw | Apr. 18, 1939 |
| 2,265,823 | Talalay | Dec. 9, 1941 |
| 2,304,717 | Swart | Dec. 8, 1942 |
| 2,539,931 | Rogers et al. | Jan. 30, 1951 |
| 2,706,183 | Carter | Apr. 12, 1955 |
| 2,882,327 | Roberts | Apr. 14, 1959 |

UNITED STATES PATENT OFFICE

CERTIFICATE OF CORRECTION

Patent No. 3,083,124                 March 26, 1963

Donald W. Rahmes

It is hereby certified that error appears in the above numbered patent requiring correction and that the said Letters Patent should read as corrected below.

Column 12, line 40, for may be" read -- made by --.

Signed and sealed this 5th day of November 1963.

(SEAL)
Attest:

ERNEST W. SWIDER
Attesting Officer

EDWIN L. REYNOLDS
Acting Commissioner of Patents